L. E. WOOD.
METAL VEHICLE WHEEL.
APPLICATION FILED JAN. 8, 1920.
1,357,266.
Patented Nov. 2, 1920.
2 SHEETS—SHEET 1.
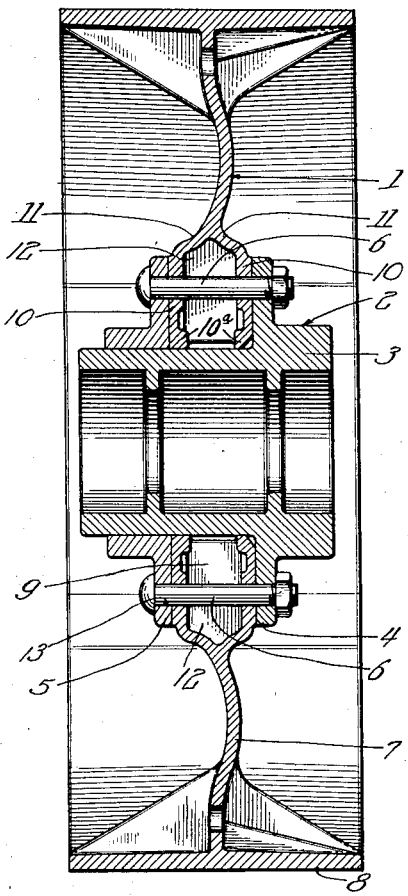
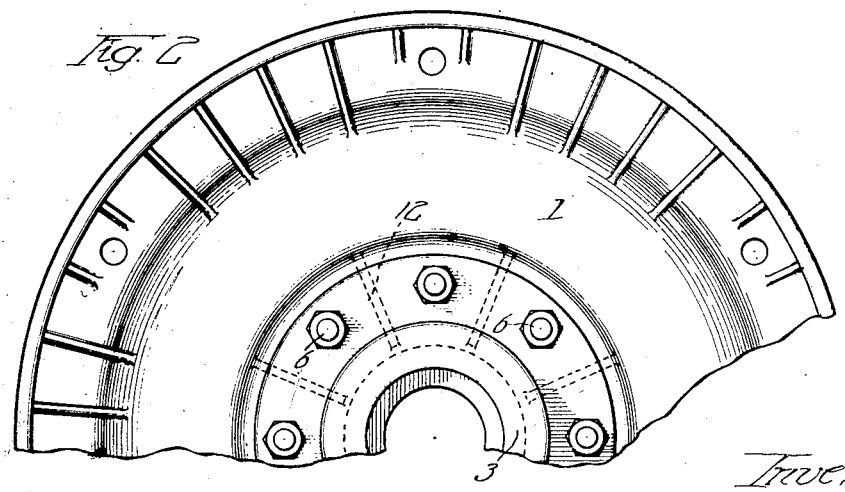
Inventor
Lloyd E. Wood L. E. WOOD.
METAL VEHICLE WHEEL.
APPLICATION FILED JAN. 8, 1920.
1,357,266.
Patented Nov. 2, 1920.
2 SHEETS—SHEET 2.
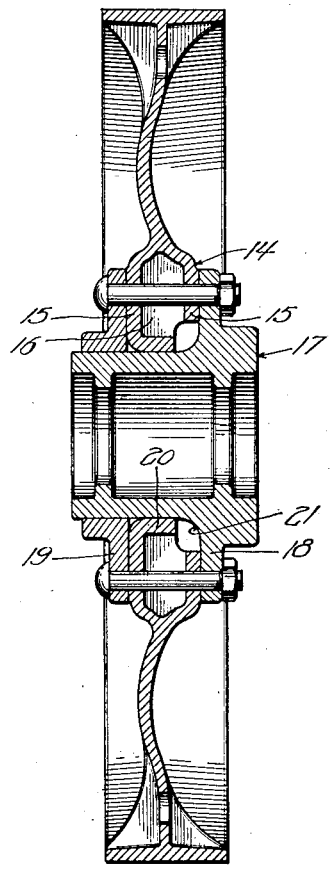
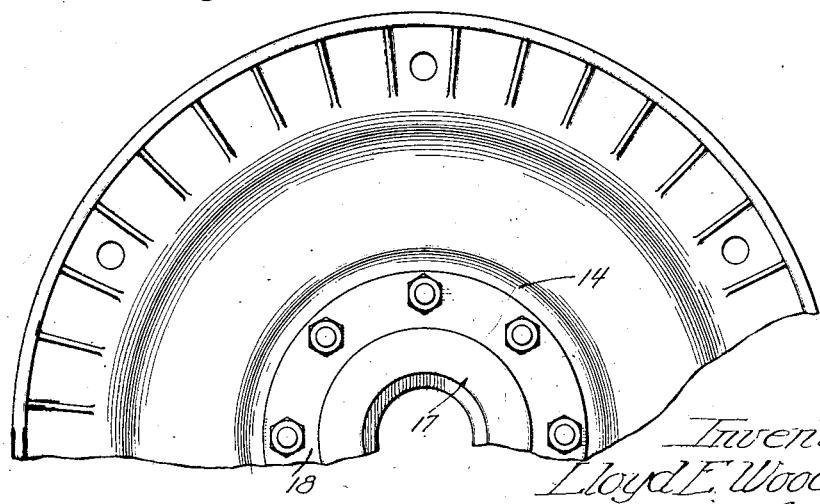

UNITED STATES PATENT OFFICE.

LLOYD E. WOOD, OF KENOSHA, WISCONSIN, ASSIGNOR TO KENOSHA WHEEL & AXLE COMPANY, OF KENOSHA, WISCONSIN, A CORPORATION OF WISCONSIN.

METAL VEHICLE-WHEEL.

1,357,266.  Specification of Letters Patent.  Patented Nov. 2, 1920.

Application filed January 8, 1920. Serial No. 350,096.

*To all whom it may concern:*

Be it known that I, LLOYD E. WOOD, a citizen of the United States, and a resident of Kenosha, in the county of Kenosha and State of Wisconsin, have invented certain new and useful Improvements in Metal Vehicle-Wheels, of which the following is a specification.

This invention relates to improvements in cast metal wheels for vehicles, and more particularly to the construction of a wheel of the character described more especially designed to be applied to a separate hub structure having those features of construction common to wooden wheels.

The object of the invention is to provide a wheel member consisting of a cast metal web section and rim, but eliminating the usual integral hub, the latter being replaced by a structure adapted to be fitted upon the hub of a wooden wheel, thus making it possible for a metal wheel to be interchangeable with a wooden wheel upon a hub common to both. The purpose of such an arrangement is manifest, namely, to effect the substitution of a metal wheel for a wooden wheel, or vice versa, without entailing the replacement of all parts of the wheel.

The manner in which the invention is carried out is hereinafter fully set forth in connection with the accompanying drawings, in which—

Figure 1 is a view in cross-section of a metal wheel embodying the features of the invention, Fig. 2 is a partial view in side elevation of the wheel, Fig. 3 is a view in cross-section of a modified form of the wheel embodying the invention, and Fig. 4 is a partial view in elevation of the wheel shown in Fig. 3.

A desirable embodiment of the invention comprises in general the metal wheel 1 adapted to be mounted upon a metal hub structure 2, the latter being designed and constructed in accordance with the approved practice in manufacturing wooden wheels, that is, wheels having wooden spokes and rims. Such a hub, although varying somewhat in minor details, is ordinarily constructed as follows: The cylindric body member 3 is mounted upon and surrounds the spindle of the vehicle wheel, and houses the roller or anti-friction bearings located intermediate the hub and the axle. Two radial flanges 4 and 5 of equal diameter extend from the body member 3, one of said flanges 4 being formed integral with the body member, and the other 5 being loose, that is, it is free to be removed from the hub, having a central opening permitting it to be slipped on the hub from one end thereof. The flanges are spaced inwardly from the ends of the body member and spaced apart from each other a distance equal to the thickness of the wooden spokes which the hub is designed to receive. In the manufacture of the wooden wheel the spokes and rim are ordinarily assembled separately from the hub and mounted thereon, the inner ends of the spokes being mortised or otherwise joined together and a central aperture provided. The body member of the hub extends through the central opening, and the spokes rigidly clamped between the flanges by means of bolts 6 extending through registering bolt holes formed in the flanges 4 and 5 and the spokes.

Referring now to the metal wheel, the same comprises a central web portion 7 and an integral rim 8 surrounding the periphery of the web portion and adapted to receive the rim and tire in the usual manner. At the center of the web portion is an annular opening slightly greater in diameter than the diameter of the body member 3 of the hub. Surrounding the central aperture of the web portion 7 there is formed a ring 9 of increased thickness or transverse dimension, and a radial dimension substantially equal to the corresponding dimension of the flanges 4 and 5. This ring or margin 9 is furthermore equal in thickness to that of the wooden spokes, and, in short, is formed to correspond in every detail to that part of a wooden wheel which would be confined between the flanges 4 and 5.

Although an obvious method to secure the additional thickness throughout this portion of the wheel web would be to merely increase the thickness of the metal uniformly on each side of the place of the web portion, it is preferred to construct the wheel in accordance with the following method, whereby an equally strong structure is obtained without increasing unduly the mass of metal and hence the weight of the wheel.

The wheel is cast in such a manner that two parallel and annular wall sections 10, 10, each of the thickness of the metal, merge from the single thickness of the metal web in the form of two divergent shoulders 11, 11, which are inclined inwardly toward the center of the wheel for a short distance and then resume a parallel relation at equal distances on either side of the plane of the web section. These walls terminate in annular edges 10ª of slightly increased thickness, which form the radial bearing surfaces of the wheels. The space between the parallel walls 10, 10 is preferably open, there being located within said space a plurality of radially disposed reinforcing webs 12 extending transversely between the walls 10, 10, and acting to afford additional strength to resist the lateral pressure upon the walls. These webs are spaced equidistantly about the annular interior space and may be of any number.

The metal wheel is applied to the hub in the same manner as the wooden wheel, namely, by passing the body member through the central aperture and applying the removable flange 5. The annular edges of the walls 10, 10 bear upon the body member and assure the proper bearing and alinement of the wheel. There are provided bolt holes 13 in the enlarged portion of the metal wheel, the location of these holes corresponding with the holes in the flanges 4 and 5. A plurality of bolts 6 identical with or the same bolts used in the wooden wheel extend through the several holes thus securing the metal wheel between the flanges and to the hub.

In Figs. 3 and 4 is illustrated a modification of the construction heretofore described in which the same general features of construction are employed except where referred to in detail. In the modified construction the ring 14 comprises the parallel walls 15, 15, as before, with the same arrangement of radial reinforcing webs 16. The hub 17, as before, has the fixed flange 18 and the loose or removable flange 19. The modification resides, therefore, in the treatment of the end portions of the walls 15, 15, as will be understood from the following: One of the walls 15 is provided with an integral flange 20 extending transversely and toward the opposite wall 15, and terminating just short of it. This flange forms a radial bearing surface of a width substantially equal to the thickness of the ring 14. The opposite wall 15 terminates in a straight edge, as before, but is shortened somewhat thereby forming an opening considerably greater in diameter than that of the hub.

The purpose of this modified formation is to provide an open space at one edge of the hub engaging portion of the ring 14 and at the same time provide a radial bearing surface. This type of construction is particularly adapted to be used where the fixed hub flange 18 is formed with an especially pronounced fillet as shown at 21, Fig. 3. By providing the annular flange 20 it is therefore possible to remove a portion of the metal, thus providing an annular space to receive the fillet 21 and permitting the walls 14 to lie flush against the flanges 18 and 19.

The advantages of a construction embodying the invention are readily apparent not only from the standpoint of manufacture, but also of convenience in the event of replacement from choice or necessity. The manufacturer of wheels can obviously produce wheels of either wood or cast metal construction using a standard hub for both types of wheels. In other words, it is possible to standardize the wheel parts to a large degree and to introduce the advantages of interchangeability of kinds of wheels.

These same advantages are equally important in the consideration of operation and maintenance of vehicles and especially repairs. For example, in replacements of wood with metal wheels where the character of service demands, it is only necessary to substitute a portion of the wheel, the hub, bearings and associated members being undisturbed, and so, in replacing a damaged wheel, as for instance where the spokes of a wooden wheel are broken, the repair can be easily and quickly made without replacing the hub and without the attendant uncertainty of obtaining the same properly fitting bearings and bearing surfaces.

The details of construction may obviously be modified without departing from the spirit of the invention and therefore I do not wish to be limited except in so far as the invention is specifically described in the appended claims.

I claim as my invention:

1. A metal wheel body comprising an integral web and rim, said web having a central portion of increased thickness consisting of spaced walls, and reinforcing webs extending between said walls.

2. A metal wheel body comprising an integral web section and rim, said web having a central aperture, and an annular portion surrounding said aperture and consisting of laterally spaced walls, and a plurality of radial webs extending transversely therebetween.

3. A wheel body comprising a metal web and rim, said web being provided with a centrally located opening surrounded by a marginal portion of double walls having webs extending transversely therebetween, one of said walls being provided with a transverse marginal flange adapted to have bearing engagement with the body member of a wheel hub.

4. A wheel body comprising a metal web and rim, said web comprising a central ring consisting of spaced parallel walls, one of said walls terminating in a marginal flange forming a radial bearing surface, and a plurality of reinforcing webs extending transversely between said walls and flange.

In witness whereof, I hereunto subscribe my name this 31 day of Dec., A. D. 1919.

LLOYD E. WOOD.